Figure 1:
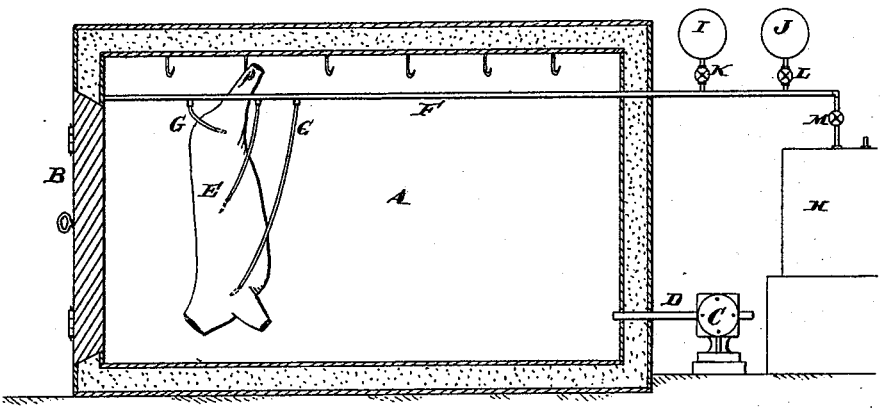

(No Model.)

G. HOLGATE.
CURING AND PRESERVING MEATS.

No. 402,736. Patented May 7, 1889.

Attest:
Henry Drury
E. W. Brickinced

Inventor:
Geo. Holgate

UNITED STATES PATENT OFFICE.

GEORGE HOLGATE, OF PHILADELPHIA, PENNSYLVANIA.

CURING AND PRESERVING MEATS.

SPECIFICATION forming part of Letters Patent No. 402,736, dated May 7, 1889.

Application filed April 17, 1888. Serial No. 270,898. (No model.)

*To all whom it may concern:*

Be it known that I, GEORGE HOLGATE, of the city and county of Philadelphia, and State of Pennsylvania, have invented an Improvement in the Process for the Preservation of Animal Matters, of which the following is a specification.

My invention has reference to processes for the preservation of animal substances; and it consists in certain improvements, all of which are fully set forth in the following specification and shown in the accompanying drawings, which form part thereof.

The object of my invention is to preserve animal substances as soon as slaughtered, and put them in such a condition that they may be subsequently conveyed long distances without becoming spoiled.

In Letters Patent No. 313,736, dated March 10, 1885, granted to me, is described a process for the preservation of animal substances by first exhausting the air from the matter to be preserved, and then treating it to an atmosphere of sulphurous and carbonic-acid gases; and in Letters Patent No. 356,766, dated February 1, 1887, granted to me, is described a method for the preservation of animal substance, substantially similar to the above, with the addition of injecting the preserving-gases into the meat or animal substance. My present process is an improvement upon these.

In carrying out this invention I inclose the meat within an air-tight receptacle, tank, or chamber, from which the air and gases are drawn by means of a suitable pump, which creates and maintains a partial vacuum therein, and into the meat contained within said receptacle I inject air that has had the heat removed by artificial or natural means. This cold air injected into the meat will expel the heat therefrom into the receptacle, whence it is drawn off by the pump, thus chilling the meat and preventing the surrounding air from becoming warm. Then inject into the meat preservative gases, which expand therein and produce an intense cold, carrying off the remaining heat of the meat, if any remain after the first chilling, and the escaping gases and their contained heat are immediately drawn off by the pump. From this it will be observed that in treating the meat a partial vacuum is maintained about it, and whatever air or gas is passed through the meat is immediately drawn off and expelled from the tank, preventing any opposition to the cooling effect of the gases. I prefer to admit the preserving-gases directly into the joints of the meat, as these are the parts which are usually the most heated, and by maintaining a partial vacuum about the meat the liquid acids are instantly vaporized and permeate every portion of the substances to be preserved, and the sudden expansion, due to the conversion of the liquids into gases, creates intense cold and eliminates the last objectionable caloric contained in the animal matter. I may, however, dispense with the injection of the gases, using only the sub-process of injecting the chilled air into the meat and removing the heat driven out by means of the pump.

Figure 2:
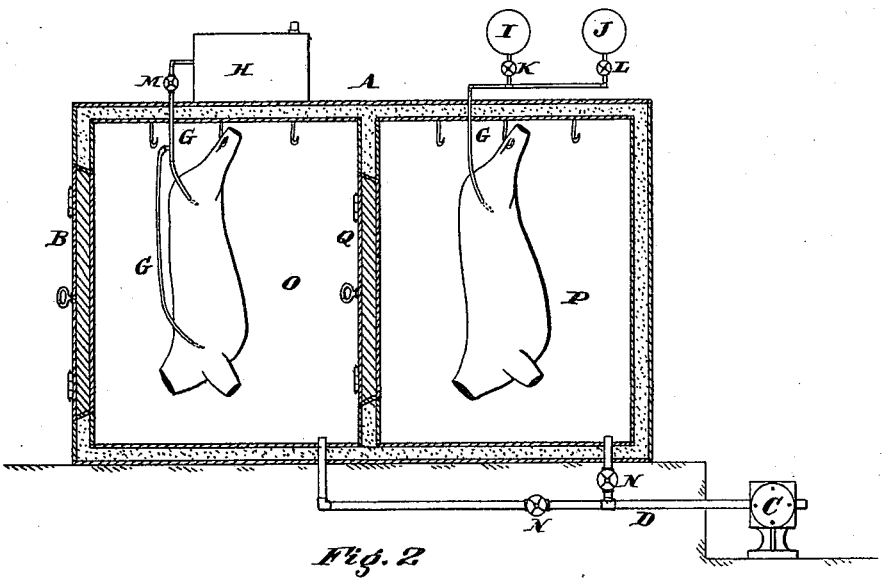

In the drawings, Figure 1 is a sectional elevation of suitable apparatus for carrying out my improved process, and Fig. 2 is a modified form of same.

A represents an air-tight chamber or tank, having an air-tight door, D, and provided with a vacuum-pump, C, and suction-pipe D, for exhausting the air and gases from the tank and maintaining a partial vacuum therein.

E represents the meat or substance to be preserved, which is hung up or placed within said chamber in any suitable manner.

F is a pipe leading to within the chamber A and provided with the tubes or pipes G, which extend to the meat and have their ends projected more or less into the same, and from which cold air or gases are caused to pass into the meat below the surfaces thereof.

H is a refrigerator or cooling apparatus of any description, by which the air may be cooled before passing into the pipe F. In cold weather natural means may be used for supplying cold air, or ice or chemicals may be used as refrigerants.

M is a valve to control the flow of air to the chamber A.

I and J represent two vessels, which may contain, respectively, preferably anhydrous carbonic-acid gas and anhydrous sulphurous-acid gas in the liquefied condition, which may be admitted to the pipe F, as desired by means of the valves K and L; or the anhydrous sulphurous-acid gas and the anhydrous carbonic-acid gas may be contained within one of such vessels in the form of a binary liquid, and this latter is the preferable form in its use, though not always easily obtainable.

In carrying out my process with these parts I produce and maintain a partial vacuum within the tank or chamber A. The valves K and L are closed and valve M opened. The cold air is fed through pipes F and G and permeates the meat, producing a chilling effect, and immediately thereafter the valve M is closed and the anhydrous sulphurous-acid gas and the anhydrous carbonic-acid gas are admitted in the liquefied or gaseous form, either as a binary fluid or separate, or one independent of the other, to the pipes F and G, and then to the meat to be preserved, below the surface thereof, where the liquid anhydrous sulphurous acid is instantly converted into gas, and, separate or in conjunction with the anhydrous carbonic-acid gas, permeates every portion of the meat, and in its expansion produces and maintains a decreased temperature. During both of these actions with air and gas the vacuum-pump C is running continually, and the escaping air or gases from the meat, with their contained heat extracted from said meat, are instantly withdrawn from the tank A.

In some cases I find it desirable to use the anhydrous sulphuric-acid gas as a liquid and to mix with it, just before being admitted to the meat, the necessary amount of carbonic-acid gas, which is about fifteen per cent. of the anhydrous sulphurous acid used. To mix the two acids it is necessary to have the carbonic acid at a high pressure, which insures its being substantially anhydrous, and therefore in the most desired condition.

Referring to Fig. 2, I have the same general apparatus, with the exception that the vessel or tank A is provided with two compartments, O and P, having an air-tight communicating-door, Q. The vacuum-pump C may exhaust the air or gas from either or both of the compartments by simply operating the valves N. In this arrangement the meat is first chilled by the air in the compartment O, and is then placed in the compartment P, where it is subjected to the action of preserving-gases.

Any other suitable form of apparatus may be used, that shown being simply illustrative of what may be used to carry out my invention.

In practice it is difficult to obtain a strictly anhydrous mixture of sulphurous and carbonic acids; hence, while I use the word "anhydrous," it is to be understood that substantially anhydrous sulphurous acid and carbonic acids are included.

I do not limit myself to the mere details, as they are of but small importance as compared with the general features of the invention, which are more specifically referred to and clearly set out in the claims.

Having now described my invention, what I claim as new, and desire to secure by Letters Patent, is—

1. The method of chilling or cooling meats, consisting in taking the meat immediately after slaughtering, putting it in a tank or chamber capable of being made air-tight, creating a partial vacuum in and around the meat, and then by means of tubes placed into the meat letting into the interior or below the surface of the meat air that has first had the heat extracted from it either by natural or artificial means.

2. The method of chilling or cooling of meats, consisting in taking the meat immediately after slaughtering, putting the meat into a tank or chamber capable of being made air-tight, creating a partial vacuum in and around the meat, then by means of tubes inserted into the meat letting into the interior or below the surface of the meat air from which the heat has been extracted by natural or artificial means, and removing the heated air from the tank or chamber so soon as it escapes from the meat into the tank or chamber.

3. The method of chilling or cooling and preserving meats, consisting in taking the meat immediately after slaughtering, putting it into a tank or chamber capable of being made air-tight, creating a partial vacuum in and around the meat, then by means of tubes letting into the interior or below the surface of the meat air from which the heat has previously been extracted by natural or artificial means, removing the heated air from around the meat as soon as it escapes into the tank or chamber, and then letting into the meats preservative gas or gases, thereby chilling and curing or preserving at one and the same time.

4. The method of cooling or chilling and preserving meats, which consists in taking the meat after it has been chilled and putting it into a tank or chamber capable of being made air-tight, then admitting into the interior of the meat anhydrous preservative gas or gases, allowing said gas or gases to expand, (thereby expelling such heat from the interior of the meat as has not been extracted by the previous chilling process,) and simultaneously therewith exhausting the gases with their contained heat from the tank or chamber as soon as liberated from the meat, whereby the meat is chilled and preserved at one and the same operation.

In testimony of which invention I hereunto set my hand.

GEO. HOLGATE.

Witnesses:
ERNEST HOWARD HUNTER,
ROBERT BEATTIE.